(No Model.)  2 Sheets—Sheet 2.
H. F. JONES.
HANDPIECE FOR DENTAL ENGINES.
No. 585,845.  Patented July 6, 1897.
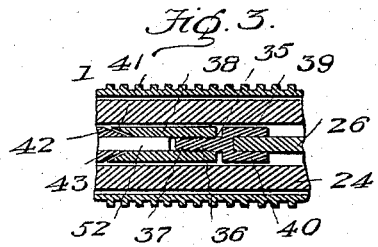
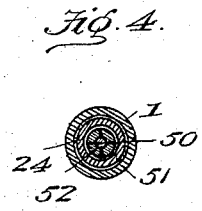
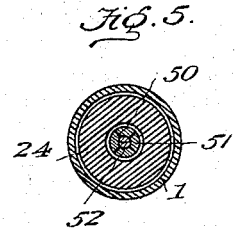
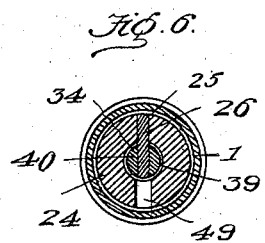
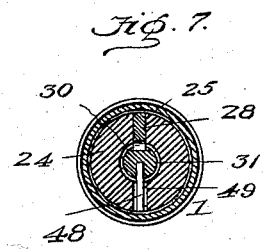
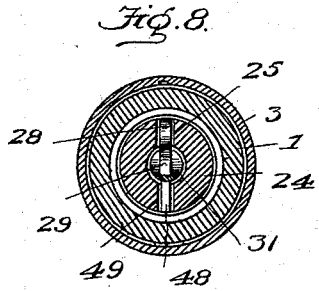
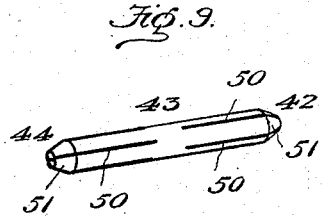
Witnesses  
Inventor  
Harry F. Jones  
By H. B. Oilson, Attorney
THE NORRIS PETERS CO., PHOTO-LITHO., WASHINGTON, D. C.

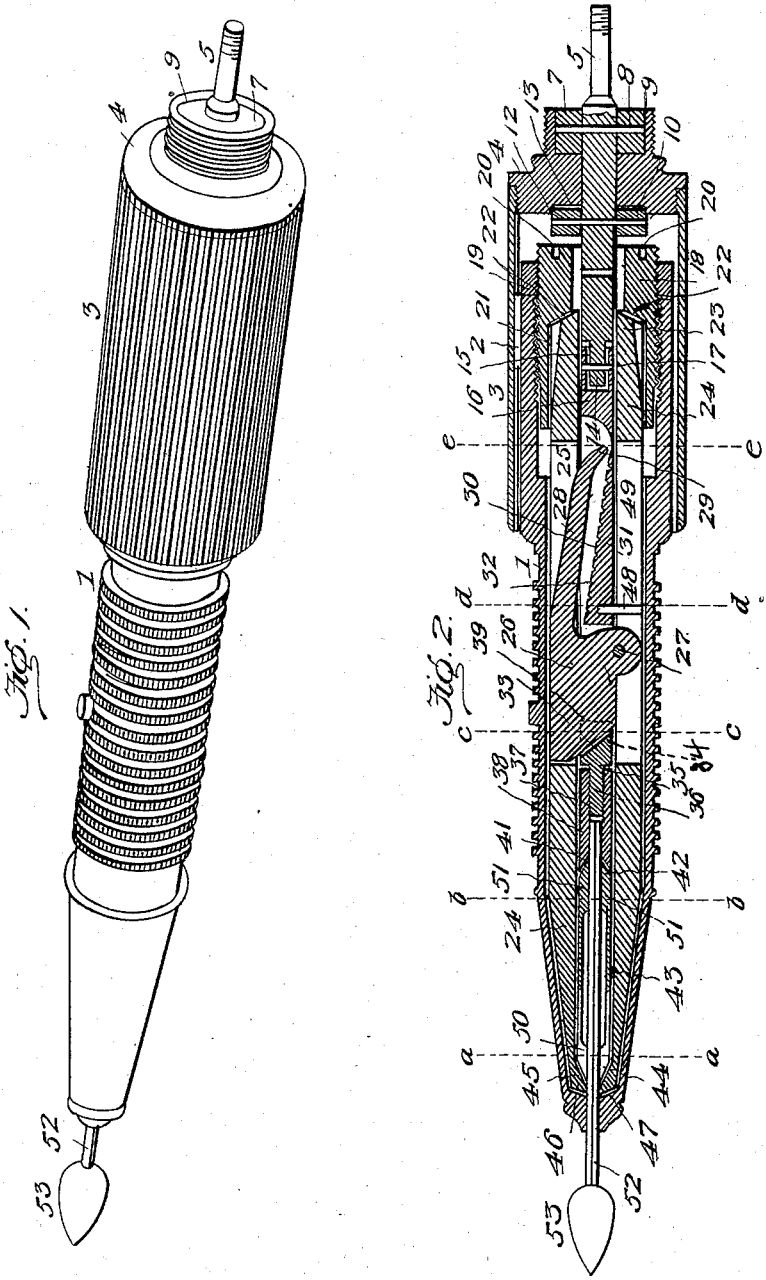

UNITED STATES PATENT OFFICE.

HARRY F. JONES, OF CAMDEN, NEW JERSEY.

HANDPIECE FOR DENTAL ENGINES.

SPECIFICATION forming part of Letters Patent No. 585,845, dated July 6, 1897.

Application filed February 4, 1897. Serial No. 622,041. (No model.)

*To all whom it may concern:*

Be it known that I, HARRY F. JONES, a citizen of the United States, residing at Camden, in the county of Camden and State of New Jersey, have invented certain new and useful Improvements in Handpieces for Dental Engines; and I do declare the following to be a full, clear, and exact description of the invention, such as will enable others skilled in the art to which it appertains to make and use the same.

My invention has relation to improvements in the construction of handpieces for dental engines; and the object is to provide a strong and durable device of this kind.

To this end the novelty consists in the construction, combination, and arrangement of the same, as will be hereinafter more fully described, and particularly pointed out in the claim.

In the accompanying drawings the same reference-characters indicate the same parts of the invention.

Figure 1 is a perspective view of my improved dental handpiece. Fig. 2 is an enlarged longitudinal section of the same. Fig. 3 is a similar view taken at a right angle to Fig. 2. Fig. 4 is a transverse section on the line *a a* of Fig. 2. Fig. 5 is a similar view on the line *b b* of Fig. 2. Fig. 6 is a transverse section on the line *c c* of Fig. 2. Fig. 7 is a similar view on the line *d d* of Fig. 2. Fig. 8 is a similar view on the line *e e* of Fig. 2, and Fig. 9 is a perspective view of the clutch.

1 represents the handle proper, and it is provided with a longitudinal key or spline 2, over which slides a sleeve 3, the key fitting a keyway in the sleeve to prevent the latter turning on the handle, while permitting it to slide freely lengthwise thereon. The inner end of this sleeve is screw-threaded to receive the hub 4, which forms a bearing for the shaft 5, the outer end of which is threaded to receive the coupling on the usual flexible shaft from the engine.

7 represents a cylindrical collar secured on the shaft 5 by a transverse pin 8 in the annular recess 9, formed in the projecting end of the hub 4. A similar collar 10 is secured to the shaft 5 by a transverse pin 12 on the inside of the hub, the contiguous face of the collar 10 extending a short distance into an annular recess 13 on the inner face of the hub to insure a perfect bearing for the shaft. The inner end of said shaft 5 terminates in a reduced shank 14, which fits loosely in a longitudinal circular recess 15 in the end of a sliding bar 16, the shank being secured in the walls of said recess by a transverse pin 17, so as to form a hinge-joint having a limited lateral play, but no end play whatever.

18 represents an externally-threaded sleeve adjustably secured in the inner end of the handle 1 by a jam-nut 19, and the inner end of this sleeve is provided with pin-holes 20 20, which are designed to engage the pins on a key-wrench for conveniently adjusting said sleeve. This sleeve 18 is formed with an annular bearing-recess 21, terminating in a cone bearing-shoulder 22, which receives the conical end 23 of the hollow driving-spindle 24, the body of which is cylindrical and which has a snug bearing in the handle 1. This hollow spindle 24 is provided with a central longitudinal slot 25, in which is fulcrumed a lever 26 on a transverse screw-pin 27. The longer arm of said lever forms a pawl 28, terminating in an inwardly-curved finger 29, which rests upon the inclined face 30 of a sliding dog 31, which forms a continuation of the sliding bar 16. The inclined face 30 of this dog 31 is formed with a series of transverse notches 32, which engage the finger 29 and hold the same rigidly against accidental displacement. The shorter arm of this lever 26 terminates in a beveled face 33, which engages the beveled head 34 of a cylindrical plunger 35, the shank 36 of which is screw-threaded and adjustably secured in a threaded longitudinal orifice 37 in the follower 38.

The beveled head 34 is formed with parallel ears 39 and 40 on each side, so as to encompass the beveled face 33 of the lever 26 and preserve the alinement of the contiguous parts.

The outer end of the follower 38 has a female-cone bearing 41, which encompasses the male cone 42 on the inner end of the split chuck 43, and the outer end of said chuck is also formed with a male cone 44, which engages the female-cone bearing 45 in the outer end of the hollow spindle 24. The end of the spindle 24 is also formed with a conical end 46, which has a bearing in the correspondingly-shaped shoulder 47 in the tapering outer end of the handle 1, and by means of the adjustable sleeve 18 it will be seen that any wear or lost motion between the driving-spindle and the handle can be taken up.

48 represents a guide-pin secured in the back of the sliding dog 31, the pin working in a longitudinal guide-slot 49 in the spindle 24, which allows the dog to have a longitudinal movement in the spindle and at the same time preserves its alinement with the finger 29.

The chuck 43 is formed at each conical end with a series of longitudinal slits 50, those at one end being arranged to break joints with the corresponding slits on the opposite end. This arrangement forms a series of spring-jaws 51 51 at each end of the chuck, and when the cylindrical shank 52 of the removable bit 53 is inserted in the chuck, as shown, and the follower forced down its conical bearing simultaneously compresses the jaws on the contiguous end of the chuck and forces the opposite conical end into the conical bearing in the outer end of the spindle 24, thus closing its jaws on the shank of the bit and securing the same as firmly in the chuck as if the two were one piece.

When the parts are in the position shown in Fig. 2, the finger 29 is at the lowest point of the inclined face 30 of the dog 31, and consequently the beveled face 33 of the lever is out of contact with the corresponding head of the plunger 35. This position releases the ends of the chuck and its spring-jaws open and release the shank of the tool or bit.

When it is desired to secure the bit in the chuck, the sleeve 3 is drawn backward on the handle 1. This movement carries with it the shaft 5, sliding bar 16, and dog 31, the inclined face 30 of which slides under the finger 29, raises the pawl 28, and throws the opposite end of the lever 26 inwardly, causing its beveled face 33 to force the plunger 35 outwardly and compress the jaws on each end of the chuck firmly on the shank of the bit, as above described.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A dental handpiece, comprising the handle 1, provided with the longitudinal key 2, and the sleeve 3, provided with a corresponding keyway, the shaft 5 journaled in said sleeve, the sliding bar 16 hinged to the inner end of said shaft, and provided with the dog 31 having an inclined transversely-notched face 30, the hollow driving-spindle 24 provided with a central longitudinal slot 25, the lever 26 fulcrumed in said spindle and provided with a pawl 28 in operative contact with the notched face of the dog 31, and having its opposite arm formed with a beveled face 33, in combination with the cylindrical plunger 35, provided with a contiguous beveled head 34, the follower 38 encompassing the threaded shank 36 of said plunger, and the split chuck 43 arranged between the outer end of the hollow spindle and the end of the follower 38, substantially as shown and described.

In testimony whereof I hereunto affix my signature in presence of two witnesses.

HARRY F. JONES.

Witnesses:
WM. H. BASSETT,
JOHN H. NESBY.